United States Patent
O'Brien

[15] 3,657,935
[45] Apr. 25, 1972

[54] DIFFERENTIAL TRANSMISSION

[72] Inventor: Loren J. O'Brien, R. R. #1, Grabill, Ind. 46741

[22] Filed: Feb. 14, 1962

[21] Appl. No.: 173,284

Related U.S. Application Data

[63] Continuation-in-part of Ser. No. 71,331, Nov. 23, 1960, abandoned.

[52] U.S. Cl. ................................................... 74/711
[51] Int. Cl. ........................................... F16h 1/44
[58] Field of Search .............................. 74/710.5, 711

[56] References Cited

UNITED STATES PATENTS

| 1,883,725 | 10/1932 | Guilmette | 74/711 |
| 2,354,214 | 7/1944 | Lockwood | 74/711 |
| 2,930,256 | 3/1960 | Wildhaber | 74/711 |
| 2,966,076 | 12/1960 | O'Brien | 74/710.5 |

FOREIGN PATENTS OR APPLICATIONS

| 446,143 | 3/1949 | Italy | 192/89 B |

*Primary Examiner*—Arthur McKeon
*Attorney*—Walter E. Pavlick and Harold D. Shall

[57] ABSTRACT

A limited slip differential or semi-locking differential comprising a pair of pinion gears mesh with a pair of side gears having spring actuated clutch means wherein the compensating action of the gearing is retarded.

9 Claims, 4 Drawing Figures

DIFFERENTIAL TRANSMISSION

This application is a continuation-in-part of my co-pending application Ser. No. 71,331 filed Nov. 23, 1960, now abandoned.

This invention relates to a differential transmission unit used in a driving axle of a vehicle for the purpose of permitting compensating rotation of one of the driving wheels relative to the other and more particularly to limited slip differentials or semi-locking differentials wherein the compensating action of the gearing is retarded.

As is very well known, when one of the rear or driving wheels of a motor vehicle having a conventional differential transmission therein loses traction and begins to spin, if the other wheel has traction it will remain stationary and not operate to move the vehicle. As a result of this condition, the motor vehicle will be completely immobilized when one of the driving wheels loses traction as is common when driving on wet, slippery, or muddy surfaces. An additional deficiency in the standard differential unit manifests itself when one of the rear wheels of the driving axle encounters a bump and is momentarily thrown from engagement with the contacting surface and thus becomes air-borne. In this instance the air-borne wheel will accelerate and spin more rapidly than the wheel which has remained in engagement with the contacting surface. When the air-borne wheel re-engages the contacting surface it will cause the vehicle to lurch or sway in response to the sudden imposition of driving force thereby.

It is true that the differential mechanism could be entirely eliminated thereby solving the above difficulties. However, a vehicle with such a construction would have great difficulty making sharp turns, and when doing so would subject the driving axle to unfavorable stresses, possibly to the extent that it would ultimately be broken.

The best possible performance, therefore, is provided when at least a minimum amount of resistance to compensation is available in the differential when one wheel is subject to low traction so that wheel slippage can be eliminated on low traction surfaces, while retaining the feature of differential action under the higher torque differential conditions encountered during turning operations and the like. It is therefore desirable to provide a braking or resistance torque to the differential which is variable in proportion to the amount of differential input torque being transmitted to the axles.

Many prior art constructions have been provided in an attempt to satisfactorily incorporate the above desired features. Generally, these prior constructions have utilized the axial thrust of the differential side gears to load a friction clutch or braking means. In addition, resilient means in the form of coil springs have been provided between the side gears to bias the side gears outwardly to provide a minimum load on the friction clutch or braking means. However, this minimum bias has adversely affected the normal operation and backlash of the side gears, for this minimum load in addition to acting on the friction clutch or braking means also acts upon the side gears. Furthermore, this mounting of the coil springs between the side gears has subjected the springs to forces which have caused excessive failures due to buckling.

Prior constructions, such as Wildhaber U.S. Pat. No. 1,750,981 have utilized a minimum bias on a differential to retard differentiation, the bias being independent of the side gears; however, such constructions have not provided means for increasing the retarding effect. Another construction, as shown in my U.S. Pat. No. 2,966,076, has also utilized a minimum bias on a differential to retard differentiation, the bias being independent of both the side gears and the case, and in addition has provided means for increasing the retarding effect. The structure of the present invention is an improvement over the structure shown in this patent and utilizes a biasing force independent of the side gears but dependent upon the differential case to obtain minimum biasing in addition to means for increasing the retarding effect.

Therefore, an object of this invention is to provide a minimum retarding action which is dependent upon the differential case and independent of the side gears, which retarding action is increased by the axial thrust of the side gears upon increase of input torque.

Another object of this invention is to utilize the axial thrust of the differential side gears in addition to a biasing force independent of the side gears to provide a simple and self-adjusting braking means on the differential action to control slippage at varying load conditions, at the same time allowing differentiation for turning.

A still further object of this invention is to provide a differential which is of simple construction, being composed of a minimum of parts, which are not only easy to fabricate and install but also very economical to manufacture.

In the preferred embodiment of this invention, a power transmission gear train is operatively disposed within a gear case. Resilient means dependent upon the gear case and independent of the gear train biases a clutch means to oppose relative rotative movement of the members of the gear train. In addition, the gears of the gear train are meshed in a relationship to provide a component of tooth pressure for urging gears of the gear train axially outwards to increase the loading of the clutch means in proportion to the input torque to the transmission. The invention has the further advantage that the resilient means and clutch means can be associated with either one or both of the side gears of the differential gear train depending upon the requirements and size limitations of the differential unit.

These and other objects and advantages of this invention will become apparent from the following detailed description when taken in connection with the accompanying drawings wherein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
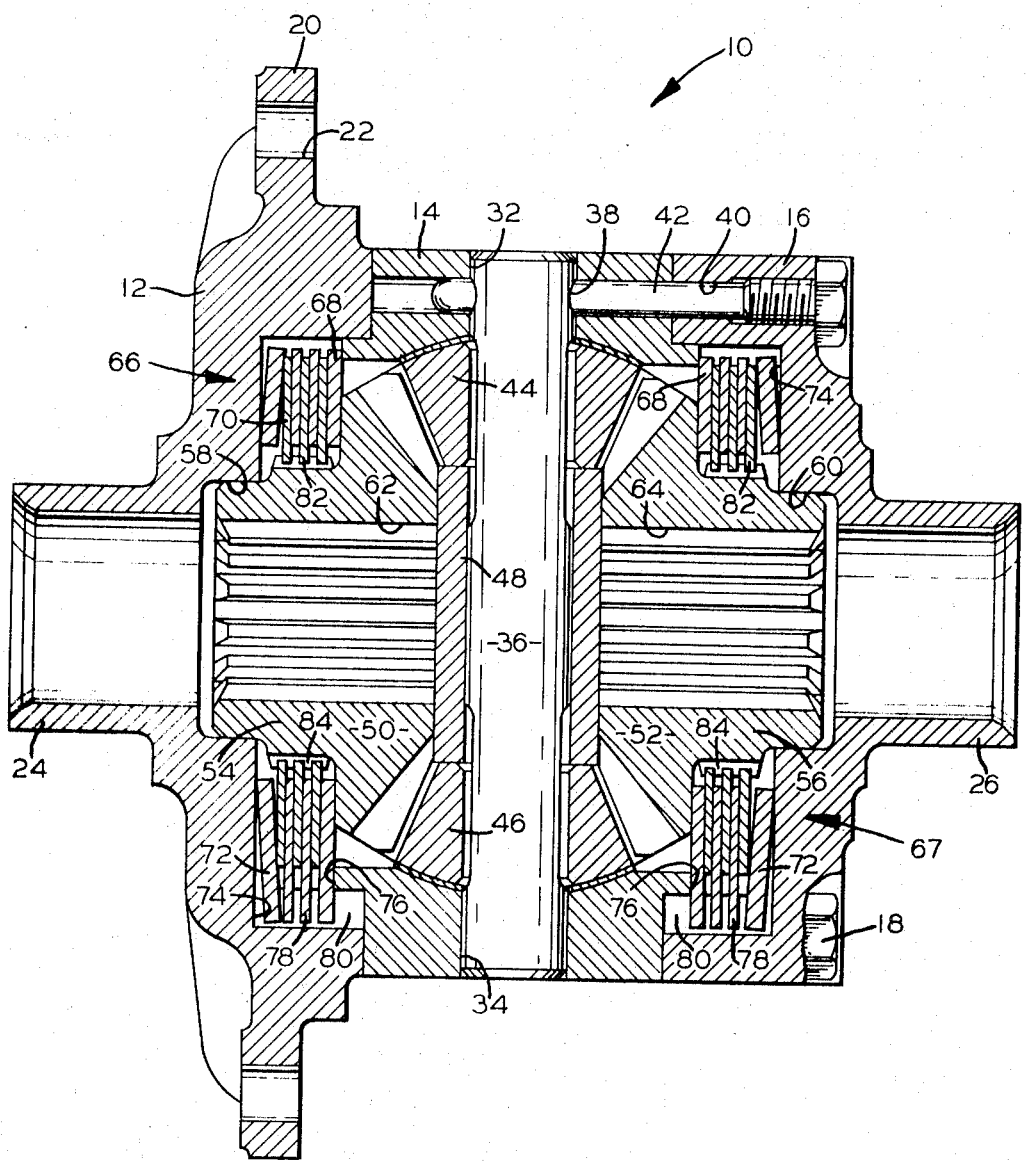
FIG. 1 is a longitudinal sectional view of one embodiment of the differential transmission of this invention.

Three embodiments of the present invention are illustrated in the drawings; the first being illustrated in FIG. 1 to which reference is now made. The differential casing shown generally at 10 is prepared as a three section assembly; as viewed in FIG. 1, the section on the left is labeled 12, the center 14, and the right section 16. After assembling the component parts of the differential the three sections are fixedly interconnected in a conventional manner, as by a plurality of bolts 18, to form the differential casing.

On the left section 12, the casing 10 is provided with an annular flange 20 to which the conventional ring gear (not shown) is attached in any suitable manner through a plurality of openings 22 disposed in the flange. The ring gear receives the power drive from a propeller shaft (not shown) and imparts this drive to the differential casing 10. A pair of opposed, axially extending, concentric hubs 24 and 26 extend outwardly from the case 10 and are prepared to rotatably receive the inward ends of splined axle shafts (not shown).

The center section 14 of the casing 10 is provided with a pair of centralized, diametrically opposed, aligned openings 32 and 34. Extending diametrically through the case 10 and positioned within the openings 32 and 34 is an elongated cylindrical spider member or pin 36. The pin 36 is provided with an axial opening 38 which is in aligned relationship with an axial, threaded opening 40 in the case 10. Extending into the opening 40 and in threaded engagement therewith is a lock pin 42 which pin passes through the aligned openings 40 in case 10 and 38 in pin 36 and fixedly positions the pin 36 relative to the case 10.

A pair of compensating gears 44 and 46 are rotatably disposed on pin 36 within case 10 in opposed relationship. Disposed centrally on the pin 36 and in abutting engagement with the inner faces of the opposed compensating gears 44 and 46 is an annular spacer block 48 for maintaining the compensating gears in spaced relationship. Thrust washers of suitable bearing material and of a configuration conforming to the back face of the compensating gears are interposed between the compensating gears 44 and 46 and the case 10 to provide for substantial frictionless engagement therebetween. The case 10 absorbs the outward thrust of the compensating gears 44 and 46 and limits the outward movement thereof.

A pair of side gears 50 and 52 are positioned within the case 10 and are disposed in opposing aligned relationship in meshing engagement with the compensating gears 44 and 46. The inner face of the side gears 50 and 52 are adapted to engage the spacer block 48, which block limits their inward movement thereby preventing the teeth of the side gears 50 and 52 from bottoming with the teeth of the compensating gears meshing therewith. The side gears 50 and 52 are prepared with outwardly extending hub portions 54 and 56 respectively which hubs are received for rotation within counterbores 58 and 60 provided in case 10. Side gears 50 and 52 are each further provided with a splined bore 62 and 64 respectively which bores receive the splined end of axle shafts for unitary rotation therewith.

Thus far, what has been described is a standard differential unit, which unit when incorporated in a drive axle of a vehicle will allow uncontrolled compensation and which further will allow one wheel to spin when it loses traction. To prevent this uncontrolled compensation, a pair of clutch means 66, 67 are provided within the case 10 to retard the relative rotative movement of the gears and thus retard the compensating action.

More specifically, the pair of clutch means 66 and 67 are disposed in surrounding relationship about the hub portion of side gears 50 and 52 respectively. Each clutch means 66 and 67 comprise sets of interleaved friction plates or disks 68 and 70 and a resilient means in the form of a Belleville spring 72. The clutch means is disposed between, and in abutting engagement with, the side walls 74 of the case 10 and a shoulder 76 provided on the case 10 and positioned between each side gear 50 and 52 and the case. Each plate 68 is provided with a plurality of spur teeth or drive lugs 78 which lugs are in driving engagement with a plurality of internal gear teeth or slots 80 provided in the case 10, thereby adapting the plate 68 and case 10 for unitary rotation. Each friction plate 70 is formed with a plurality of internal spur gear teeth 82 interlocked with cooperating spur gear teeth 84 provided on the respective side gear thereby preparing the plates 70 and the side gear 50 or 52 for unitary rotation.

To maintain a minimum preload or bias on the interleaved disks 68 and 70, a resilient means in the form of a Belleville spring 72 is disposed between the disks and the side wall 74 of the case 10. While the plates 68 and 70 are mounted for unitary rotation with the case and side gears respectively, it is readily apparent that the plates are slidable in an axial direction. The Belleville spring 72 biases the interleaved disks against the shoulder 76 thereby providing a minimum engaging force between the disks and retarding the relative rotational movement between each side gear and the case 10 and between the side gears 50 and 52 themselves. Since the Belleville spring 72 engages the case 10 at the wall 74 and biases the clutch 66 against the shoulder 76 of the case 10, the entire reaction of the Belleville spring 72 is contained within the case 10 and is independent of the gear train. It should be noted that the Belleville spring 72 may be positioned between the clutch 66 and the shoulder 76 thereby biasing the clutch into engagement with the wall 74 or may be positioned between adjacent members 68, 70 of the clutch 66 or 67 and bias portions of the clutch into engagement with both the shoulder 76 and the wall 74 to obtain the minimum preload.

To increase the frictional resistance to the compensating action of the differential above the minimum provided by the resilient means and in proportion to the input torque thereto, the compensating gears and side gears are provided with positive pressure angle teeth. Thus, in response to the imposition of torque to the differential unit, the side gears 50 and 52 will be urged axially outward and engage and further compress the interleaved disks 68 and 70 thereby further retarding relative rotation between the side gears and the case 10 and between the side gears themselves.

Figure 2:
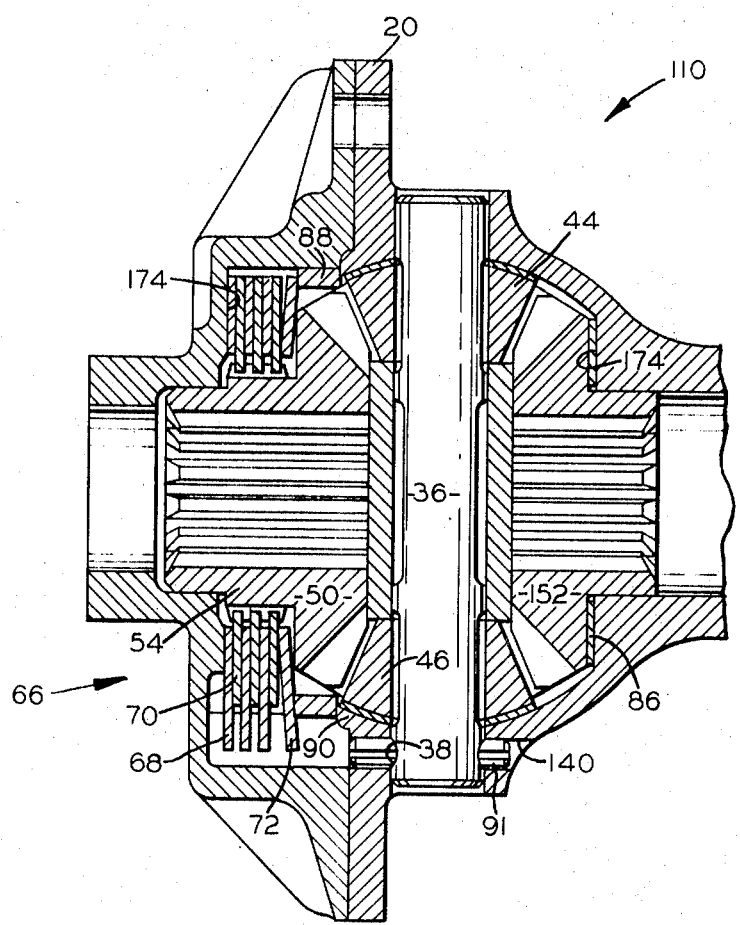
FIG. 2 is a longitudinal sectional view of another embodiment of this invention.

Referring now to the second embodiment of the invention as shown in FIG. 2, wherein identical parts are designated by the same numeral as used on the first embodiment and corresponding parts have the same numeral plus 100, thus, the differential case is shown generally at 110 and is prepared as a two section assembly which sections are fixedly interconnected in any suitable manner. The spider member 36 is fixedly positioned in the case by means of a slotted roll pin 91 which is pressed into the aligned openings 38 in the spider 36 and 140 in the casing 110. The disposition of the compensating gear train in this embodiment is the same as in the first embodiment; the difference in the two embodiments being in the arrangement of the clutch means. In this embodiment only a single clutch means 66 is disposed within the case 110 and surrounds the hub 54 of one side gear 50. The second side gear 152 is disposed within the case 110 and interposed therebetween is a single thrust plate 86. The assembly of the clutch means 66 and Belleville spring 72 is in abutting engagement on one side thereof with the side wall 174 of case 110 and an annular ring 88 on the other side. The ring 88 is further in abutting engagement with a shoulder 90 provided in the case 110 which shoulder prevents axial movement of the ring 88 in a direction away from side wall 174. It should be noted that the ring 88 may be provided as an integral part of the case 110 instead of the separate ring as shown. The Belleville spring 72 is shown positioned between the clutch means 66 and the shoulder 88 and biases the interleaved disks 68 and 70 against the side wall 174 providing a minimum engaging force between the disks thereby retarding the relative rotational movement between the side gear 50 and the case 110. As in the first embodiment the reaction of the spring 72 is contained entirely within the case 110 and independent of the gear train. If desired, the Belleville spring 72 may be positioned between the wall 174 and the clutch means 66 thereby biasing the clutch means against the ring 88, or it may be positioned between adjacent members 68, 70 of the clutch means thereby biasing the clutch means apart into engagement with both the wall 174 and the ring 88. Since the gear 50 is retarded in its rotational movement, the compensating gears 44 and 46 which are meshed therewith and the other side gear 152 are also retarded in their rotational movement.

To increase the frictional resistance to the compensating action of the differential above the minimum provided by the resilient means and in proportion to the input torque thereto, the compensating gears and the side gears are provided with positive pressure angle teeth. Thus, in response to the imposition of torque to the differential unit, the side gears 50 and 152 will be urged axially outward and the gear 50 will engage and further compress the interleaved disks 68 and 70 thereby further retarding relative rotation between the side gear 50 and the case 110 and between the side gears themselves as previously described.

Figure 3:
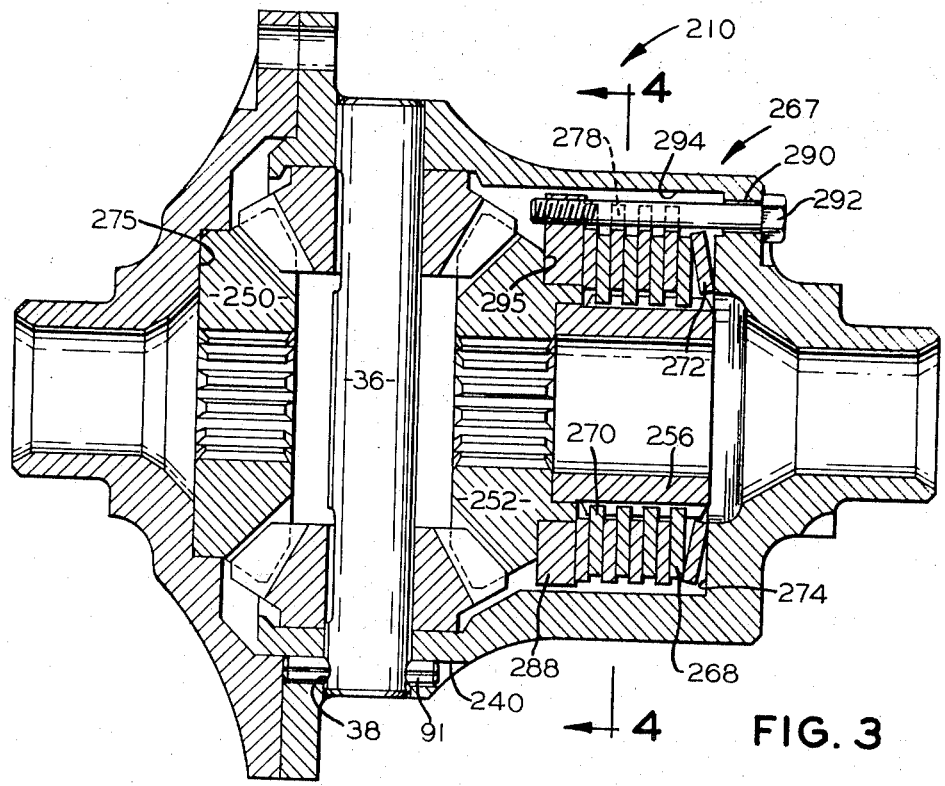
FIG. 3 is a longitudinal sectional view of another embodiment of this invention.
Figure 4:
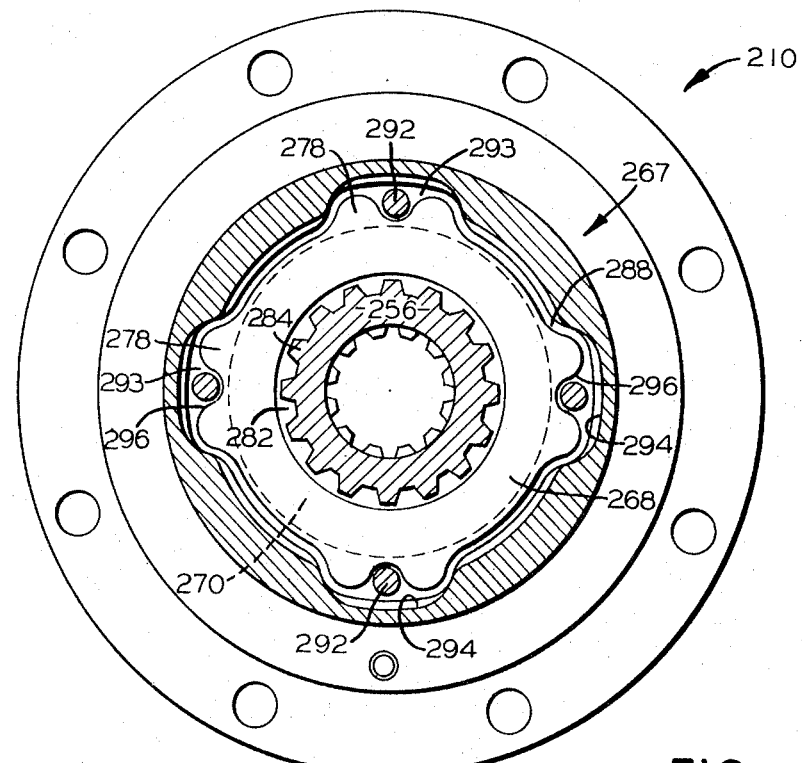
FIG. 4 is a cross sectional view taken along the line 4—4 of FIG. 3.

Referring now to the third embodiment of the invention as shown in FIGS. 3 and 4, wherein identical parts are designated by the same numeral as used in the first and second embodiments and corresponding parts have the same numeral plus 200, the differential case is shown generally at 210 and is prepared as a two section assembly, which sections are fixedly connected in any suitable manner. The spider member 36 is fixedly positioned in the case by means of a slotted roll pin 91 which is pressed into the aligned openings 38 in the spider 36 and 240 in the casing 210. The positioning of the compensating gear train in this embodiment is the same as in the first two embodiments; the difference in this embodiment from the previous two is in the arrangement of the clutch means.

The clutch means 267 is disposed within the case 210 and surrounds an extended hub 256 of the one side gear 252. The second side gear 250 is disposed in the case 210 and abuts the inner wall 275 thereof, thereby being held against outward axial movement. The clutch means 267 is in abutting engagement on one side thereof with an annular pressure ring 288 which is mounted in the case 210 for axial movement while being unitarily rotatable therewith. A Belleville spring 272 is positioned between the wall 274 of the case 210 and the remainder of the clutch means 267 and biases the interleaved disks 268 and 270 against the pressure ring 288 providing a minumum engaging force between the disks thereby retarding the relative rotative movement between the side gear 252 and the case 210. If desired, the spring 272 may be positioned between the remainder of the clutch means 267 and the pressure ring 288 thereby biasing the clutch means against the wall 274 to obtain a minimum engaging force, or the spring 272 may be positioned between adjacent members 268, 270 of the clutch means itself thereby biasing portions of the clutch outwardly into engagement with both the wall 274 and the ring 288.

The pressure ring 288 while being mounted for axial movement in the case 210 is provided with means for limiting the inward axial movement thereof. More particularly, a plurality of bolts 292 are each slidably received in an axially extending opening 290 provided in the wall 274 of the case 210. The inner ends of bolts 292 threadedly engage the pressure ring 288 in radially extending, circumferentially spaced bosses 293 provided thereon while the bolt heads engage the outside of the case. Since the pressure ring 288 is carried by the case, the entire reaction of the Belleville spring 272 is contained within the case 210 and is independent of the gear train.

The case 210 is formed with a plurality of axially extending circumferentially spaced grooves 294 disposed in registration with the bosses 293 and receives the same for axial movement while being adapted to abuttingly engage the sides of the bosses 293 to prevent relative rotation between the pressure ring 288 and the case 210. The inner side of the pressure ring 288 is in adjacent relationship with the back face 295 of the side gear 252.

The disks 268 are formed with a plurality of radially extending drive lugs 278 in registration with the bosses 293 and positioned within the grooves 294 in the case 210. The lugs 278 are provided with detents 296 formed medially in the periphery thereof, which detents accommodate the passage therethrough of the bolts 292 while being adapted to laterally engage the same and thus are held against rotary movement relative to the case 210. The disks 270 are each provided with internal spur teeth 282 slidably interlocked with cooperating teeth 284 on the hub 256 of side gear 252 thus securing the disks 270 on the side gear 252 for unitary rotation and relative axial movement.

In operation, the bolts 292 are threaded into the pressure ring 288 to an extent sufficient to provide the desired minimum preload or bias on the interleaved disks 268 and 270 by compressing the disks and the Belleville spring 272 between the ring 288 and the wall 274 of the case 210. This preload may be adjusted as desired by threading the bolts 292 into or out of the ring 288. It is apparent that the loss of preload, as a result of wear or for other reasons, can be corrected by adjusting the bolts 292 without disassembling the units since the heads of the bolts extend from the case 210.

To increase the frictional resistance to compensation of the differential above the minimum provided by the resilient means and in proportion to the input torque thereto, the compensating gears and side gears are provided with positive pressure angle teeth. Thus, in response to the imposition of input torque to the differential unit, the side gears 250 and 252 will be urged axially outwardly. The side gear 250, since it abuts the wall 275 of the case 210, will be held against axial movement thereby. The back face 295 of the side gear 252 will engage the pressure ring 288 and carry the same along with the threadedly attached bolts 292 outwardly therewith (the bolts 292 merely slide in case openings 290) further compressing the interleaved disks 268 and 270 thereby further retarding relative rotation between the side gear 252 and the case 210 and between the side gears themselves as previously described.

From the foregoing it is apparent that differential transmissions have been provided wherein an initial bias or preload independent of the side gears but dependent upon the differential case resists compensating action and upon the increase of input torque to the differential, the side gears thereof are moved axially outward by the positive pressure angled teeth of the gear train to increase the resistance to compensation.

While only three embodiments of this invention have been shown and described, it is apparent that there may be many changes in structure as well as operation without departing from the scope of the appended claims.

What is claimed is:

1. A differential transmission unit comprising in combination, a gear case, a power transmission gear train operatively positioned within said case, clutch means operatively connected to said gear train and said case for opposing the relative rotation of members of said gear train, resilient means reacting against said case and engaging said clutch means with the bias thereof being independent of said gear train for loading said clutch means, and means for adjusting the load imposed on said clutch means by said resilient means, the gears of said gear train being meshed in a relationship to provide a component of tooth pressure for urging at least one gear of said gear train axially outward to increase the loading of said clutch means in proportion to the input torque of the transmission.

2. A differential transmission unit comprising in combination, a rotatable gear case, a power transmission gear train operatively positioned within said case, clutch means operatively disposed between said gear train and said gear case for opposing relative rotation of the members of said gear train, said clutch means including a pair of friction surfaces at least one of which is associated with said gear train for rotation therewith and another of which is associated with said gear case for rotation therewith, adjustably abutment means carried by said gear case, means carried by said case for adjusting the position of said abutment means, and resilient means reacting against said abutment means and said case and engaging said clutch means with the bias thereof being independent of said gear train for causing engagement of said friction surfaces, the gears of said gear train being meshed in a relationship to provide a component of tooth pressure for urging at least one gear of said gear train axially outward to increase the force supplied to said friction surfaces in proportion to the input torque to the transmission.

3. In a differential transmission unit the combination comprising a rotatable gear case, a power transmission gear train operatively positioned within said case and including a compensating gear and a pair of side gears intermeshed therewith, clutch means operatively disposed between at least one of said side gears and said gear case for opposing relative rotative movement of the members and said gear train, said clutch means including at least a pair of cooperating friction surfaces, and a spring washer engaging said case and said clutch means with the bias thereof being independent of said side gears and applying a force on said friction surfaces acting toward said gear case for loading said friction surfaces, the compensating gear and the side gears being meshed in a relationship to provide a component of tooth pressure for urging said side gears axially outward to increase the force applied to said friction surfaces in proportion to input torque to the transmission.

4. A differential transmission unit comprising in combination, a rotatable gear case, a power transmission gear train operatively positioned within said case and including a plurality of compensating gears and side gears, clutch means operatively disposed between one of said side gears and said gear case for opposing relative rotative movement of the members of said gear train, said clutch means including a plurality of interleaved friction plates, some of which are secured to one of said side gears for rotation therewith and others of which are secured to said gear case for rotation therewith, and spring means engaging said case and said clutch means and independent of said gear train biasing said interleaved friction plates axially outwards against said case, the pitch line of said side and compensating gears being disposed at an angle to utilize the axial thrust of the meshing teeth of said gears to supplement said spring means and increase the force applied to said friction plates in proportion to the torque input to the transmission.

5. In a differential transmission unit the combination comprising, a rotatable gear case, a power transmission gear train operatively positioned within said case and including a plurality of compensating gears and side gears, clutch means operatively disposed between one of said side gears and said gear case for opposing relative rotative movement of the members of said gear train, said clutch means including a plurality of interleaved friction plates, some of which are secured to said one side gear for rotation therewith and others of which are secured to said gear case for rotation therewith, and spring means engaging said case and said clutch means with the bias thereof being independent of said gear train and biasing said clutch means axially inwards against said case, the pitch line of said side and compensating gears being disposed at an angle to utilize the axial thrust of the meshing teeth of said gears to supplement said spring means and increase the force applied to said friction plates in proportion to the torque input to the transmission.

6. In a differential transmission unit the combination comprising, a rotatable gear case having an inner end face, a power transmission gear train operatively positioned within said case and including a plurality of compensating gears and side gears, clutch means operatively disposed between one of said side gears and said inner end face of said gear case for opposing relative rotative movement of the members of said gear train, said clutch means including a plurality of interleaved friction plates, some of which are secured to one of said side gears for rotation therewith and others of which are secured to said gear case for rotation therewith, abutment means carried by said case and spaced from said inner end face, and spring means engaging said abutment means and said clutch means with the bias thereof being independent of said gear train and biasing said interleaved friction plates axially outwards against said inner end face of said case, the pitch line of said side and compensating gears being disposed at an angle to utilize the axial thrust of the meshing teeth of said gears to urge said one side gear outwardly to supplement said spring means and increase the force to said friction plates in proportion to the torque input to the transmission.

7. In a differential transmission unit the combination comprising a rotatable gear case, a power transmission gear train operatively positioned within said case and including a plurality of compensating gears and side gears, clutch means operatively disposed between one of said side gears and said gear case for opposing relative rotative movement of the members of said gear train, said clutch means including a plurality of interleaved friction plates, some of which are secured to one of said side gears for rotation therewith and others of which are carried by said gear case for rotation therewith, abutment means carried by said gear case including means being externally adjustable for positioning said abutment means relative to said case, and spring means reacting between said abutment means and said gear case independent of said gear train and engaging said clutch means, said spring means biasing said interleaved friction plates into engagement for loading said friction plates, the pitch line of said side and compensating gears being disposed at an angle to utilize the axial thrust of the meshing teeth of said gears to supplement said spring means and increase the force to said friction plates in proportion to the torque input to the transmission.

8. In a differential transmission unit the combination comprising, a rotatable gear case, a power transmission gear train operatively positioned within said case and including a plurality of compensating gears and side gears, clutch means operatively disposed between one of said side gears and said gear case for opposing relative rotative movement of the members of said gear train, said clutch means including a plurality of interleaved friction plates, some of which are secured to one of said side gears for rotation therewith and the others of which are carried by said gear case for rotation therewith, abutment means carried by said gear case for rotation therewith, adjustable means engaging said case and said abutment means for fixedly positioning said abutment means relative to said case against the axially inward movement thereof, and spring means engaging said clutch means for biasing said interleaved friction plates into engagement, said spring means and said friction plates being disposed between said abutment means and said case means and compressed therebetween, said one side gear being adapted to engage and axially urge said abutment means thereby further compressing said interleaved friction plates, the pitch line of said side and compensating gears being disposed at an angle to utilize the axial thrust of the meshing teeth of said gears to supplement said spring means and increase the force to said friction plates in proportion to the torque input to the transmission by urging said one gear axially into engagement with said abutment means thereby further compressing said interleaved friction plates.

9. In a differential transmission unit the combination comprising, a rotatable gear case, a power transmission gear train operatively positioned within said case and including a plurality of compensating gears and side gears, clutch means operatively disposed between one of said side gears and said gear case for opposing relative rotative movement of the members of said gear train, said clutch means including a plurality of interleaved friction plates, some of which are secured to one of said side gears for rotation therewith and axial movement relative thereto and other of which are carried by said gear case for rotation therewith and axial movement relative thereto, abutment means carried by said gear case for rotation therewith and axial movement relative thereto, adjustable means engaging said case and said abutment means for fixedly positioning said abutment means relative to said case against axially inward movement thereof, said adjustable means including a plurality of bolts slidably received in said case and threadedly engaging said abutment means and having the heads thereof adapted to engage the outside of said case to limit the inward movement thereof, and spring means engaging said clutch means for biasing said interleaved friction plates into engagement, said spring means and said friction plates being disposed between said abutment means and said case and compressed therebetween thereby urging said abutment means inwardly against the positioning thereof by said adjustable means, said one side gear being adapted to engage and axially urge said abutment means thereby further compressing said interleaved friction plates, the pitch line of said side and compensating gears being disposed at an angle to utilize the axial thrust of the meshing teeth of said gears to supplement said spring means and increase the force to said friction plates in proportion to the torque input to the transmission by urging said one gear axially into engagement with said abutment means thereby further compressing said interleaved friction plates.

* * * * *